June 5, 1956 — C. M. L. L. BOURCIER DE CARBON — 2748,898
SHOCK ABSORBER WITH CANTILEVER DISC SPRING VALVES
Filed June 11, 1951

INVENTOR
C. M. L. L. Bourcier De Carbon

By Watson, Cole, Grindle & Watson

United States Patent Office 2,748,898
Patented June 5, 1956

2,748,898

SHOCK ABSORBER WITH CANTILEVER DISC SPRING VALVES

Christian Marie Lucien Louis Bourcier de Carbon, Paris, France

Application June 11, 1951, Serial No. 230,944

Claims priority, application France June 13, 1950

3 Claims. (Cl. 188—88)

The present invention relates to a piston for shock-absorbers designed for fluid shock-absorbers and more particularly for hydraulic shock-absorbers.

In my patent application, Serial No. 22,836 of April 23, 1948, I have described a double acting piston, i. e. braking in two opposite directions and essentially acting by laminating of the fluid on an extremely thin lever between the piston and the cylinder. Such a piston has numerous advantages and affords maximum comfort due to the provision of braking that is well proportional to the speed of the piston in the cylinder, and particularly to the elimination of the braking of kinetic origin in the mathematic formula of which always contains a term proportional to the acceleration, what is extremely detrimental to the comfort.

In the said patent application, it has been noted that such a piston could be improved by the addition of inner ducts provided with valves, and it has been recommended to form these valves with balls and spiral springs. Unfortunately, such valves are frequently the cause of numerous annoyances and their operation is attended by very noisy oscillations that are rather difficult to get rid of. Moreover, said spiral springs permanently remain under tension and as they are submitted to strenuous working during the operation of the shock-absorber, they have a tendency to weaken after a certain time.

The present invention relates to a laminar piston, i. e. with laminating of the fluid between piston and cylinder walls and the valves of which are so arranged that they operate in both directions and are formed with a single layer of brass foil or with a pile of brass foils, that lie flat and consequently without any initial tension at right angles with the piston axis and on each of the sides of the piston, and serve to close the ports of the inner ducts bored in the piston. Said brass foils are altogether sufficiently flexible so as to be bent under pressure and sufficiently strong in order to uncover the outlet port of said ducts, in a degree proportionate to the pressure, i. e. to the strain exerted on the piston rod, the outlet port of said ducts.

Other objects and features of novelty will be apparent from the following specification when read in connection with the accompanying drawings in which certain embodiments of the invention are illustrated by way of example.

Figure 1:
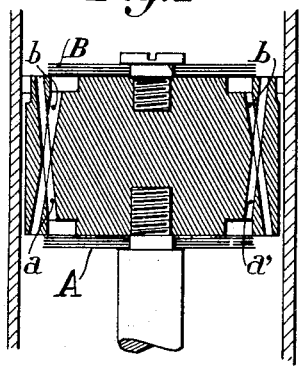
Figure 1 is a view in longitudinal section of a piston and cylinder combination generally in accordance with my invention but showing valve and passageway arrangements following certain examples in the prior art.

The necessity for the valves to be operated in two opposite directions requires a peculiar arrangement for the path of the inner ducts. Such an arrangement of valves can be embodied according to the diagram of Figure 1: ducts $a$ and $a'$ on the one hand, connecting the upper part of the cylinder with the lower part of same when overpressure prevails in the upper part, that is when the piston is moving upwards, due to the flexibility of the brass foil disks A under the action of said overpressure at the outlet of the ducts $a$ and $a'$; ducts $b$ and $b'$ on the other hand and brass foils disks B playing a symmetrical part when the piston is moving conversely.

The outlet of the ducts $a$ and $a'$ closed by the brass foils disks may have the shape of an annular groove or channel in which all the inner ducts $a$ and $a'$ open, the brass foils disks operating in the same way as cup springs and their deformation under pressure giving them a slightly conical shape coaxial with the piston.

But experience and theory show that this conical deformation of the brass foil disks is very limited and allows a relatively small opening of the outlet ports. In order to obtain larger movements of the brass foil under the action of pressure and consequently, larger outlet ports without risks of rupture or of permanent deformation for the brass foil blades, there is a considerable interest that the brass foil be operated, not under a conical deformation, as in the preceding instance, but under mere flexure so that it takes, under the action of the pressure a cylindrical shape with generatrices at right angles with the piston axis. Said arrangement of valves with progressive opening of brass foil blades operating under mere flexure is an essential feature of the present invention.

Figure 2:
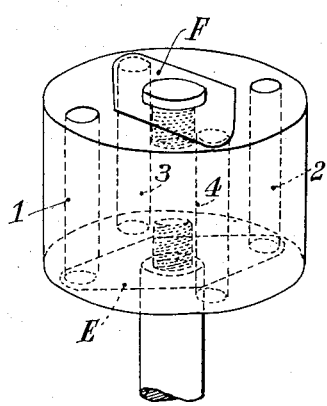
Figure 2 is a view in perspective of a piston showing one embodiment of the present invention.
Figure 4:
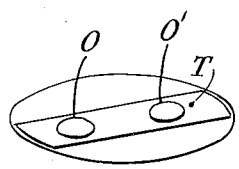
Figure 4 is a detail perspective view showing a variation in the valve securing means and also illustrating a separately usable reinforcing provision.

Such an arrangement of brass foil valves operating under mere flexure is embodied according to the diagram of Figure 2 by a single cylindrical piston bored with 4 longitudinal ducts 1, 2, 3 and 4 the two first ones being closed by the bundle of brass foil blades E, and the two others, by the bundle of brass foil blades F, both bundles being arranged at right angles in opposite sides of the piston as seen in the drawing.

Figure 3:
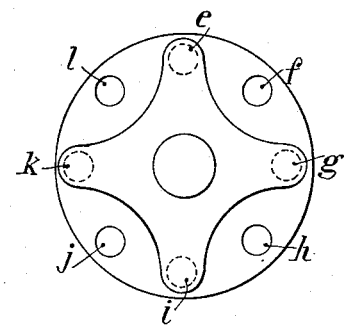
Figure 3 is a plan view of the outer end of a piston showing a valve arrangement constituting another embodiment of the invention.

The same result can be obtained in the same way, but with a larger number of ducts, when using brass foil blades formed as stars G, attached as the preceding in their middle parts, and arranged as in Fig. 3, that shows in elevation such a piston at right angles with one of its sides, the flexible arms of the upper star, when at rest or in repose, closing the ducts $e$, $g$, $i$, $k$ and the arms of the lower star (not shown) closing the ducts $f$, $h$, $j$ and $l$. Flexible stars having a larger number of arms could also be used.

It is well understood that the ducts may have other shapes or be more numerous without departing from the scope of the invention, but the preferred preceding arrangements permit the realization of the best laws for the flowing of the fluid resulting from the opening of the valves as a function of the stress exerted on the piston.

In all the preceding arrangements, the disks, blades and stars of brass foil may be used either singly or as a bundle of several disks, blades or stars, said arrangement in the form of a bundle of brass foil blades operating elastically thus forming an essential feature of the present invention, in its use, for the same stress constant (that is for the same proportion of the deflection of the brass foil relatively to the necessary stress for producing said deflection) of thinner brass foils which permits considerably reducing the stress on steel. With a sufficiently resistant single part it generally is impossible to obtain a sufficient number of ports without avoiding rupture or permanent distortion as a consequence of the too large stresses imposed to the metal that consequently must be chosen in thicker blades.

It is possible to specify that the optimum thickness of the disks or blades of brass foil is about from 15 to 30 hundredths of a millimeter when the question is of shock absorbers for passenger cars. For the shock absorbers designed for heavy trucks the blades have to be stronger, their thickness being liable to be double of that of the thicknesses for passenger cars.

Of course, the descriptions corresponding to the different figures are only given as preferred embodiments and are by no way limitative, but they allow of better understanding the invention and of illustrating the necessity of peculiar arrangements in order to secure the operation of braking valves with progressive opening in the two opposite directions of the movement of the piston. These descriptions particularly show the necessity of using said symmetrical braking valves on each of the sides of the piston, said necessity of a symmetrical operation of the shock-absorber in view of obtaining the optimum comfort having been put in evidence by the applicant and being in opposition with the generally admitted belief in motor car art according to which it would be convenient to brake only the spacing between axle and underframe, the bringing nearer of the aforesaid parts being free, or only slightly braked.

Through the different arrangements of valves described in the present application are preferably applicable to a piston moreover provided with a flowing by laminating of the fluid in a very thin layer (of about 10 to 20 hundredths of millimeter between the piston and the cylinder) said laminating conferring to the piston laws of operation allowing of a quite remarkable comfort, it is well understood that a piston without laminating of fluid between piston and cylinder but provided with the arrangements of valves hereinbefore described would be included within the scope of the present invention.

I claim:

1. In a double acting shock absorber of the class described, a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, certain of said passageways serving to transmit fluid in one direction through the piston and other of said passageways serving to transmit fluid in the opposite direction, and valve means controlling the selective flow of fluid in said respective passageways; said passageways being arranged so that the first named passageways for flow in said one direction are circumferentially spaced from the second named passageways for flow in the opposite direction, said valves comprising at least one flat resilient leaf element secured to the intermediate portion of one face of the piston and at least one flat resilient leaf element secured to the intermediate portion of the opposite face of the piston, said leaf elements adapted in repose to fit snugly over and seal the respective openings of the respective passageways which they control and to be spaced from the openings of the other passageways, the construction and arrangement being such that the leaf elements are stressed and resiliently bent only in a simple substantially cylindrical configuration by fluid issuing under pressure from the openings which they cover; there being four passageways through the piston, two diametrically opposite ones for flow in one direction and two diametrically opposite ones in a plane spaced about 90° from the plane of the first pair of passageways for flow in the opposite direction; and the resilient leaf elements being narrowed somewhat transversely of the face of the piston so that they avoid the openings into the pair of passageways they are not intended to control, and cover the openings of the pair that they are intended to control.

2. In a double acting shock absorber of the class described, a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, certain of said passageways serving to transmit fluid in one direction through the piston and other of said passageways serving to transmit fluid in the opposite direction, and valve means controlling the selective flow of fluid in said respective passageways; said passageways being arranged so that the first named passageways for flow in said one direction are circumferentially spaced from the second named passageways for flow in the opposite direction, said valves comprising at least one flat resilient leaf element secured to the intermediate portion of one face of the piston and at least one flat resilient leaf element secured to the intermediate portion of the opposite face of the piston, said leaf elements adapted in repose to fit snugly over and seal the respective openings of the respective passageways which they control and to be spaced from the openings of the other passageways, the construction and arrangement being such that the leaf elements are stressed and resiliently bent only in a simple substantially cylindrical configuration by fluid issuing under pressure from the openings which they cover; there being eight passageways through the piston, said passageways being arranged in diametrically opposite pairs, alternate pairs controlling flow in respective opposite directions; and the resilient leaf elements being cruciform in plan, the four arms thereof adapted to cover the openings into the four passageways they are supposed to control and avoid the alternate intervening ones on opposite sides of the piston, and each of the four arms adapted to curl in a simple substantially cylindrical flexure under fluid pressure from its respective opening.

3. In a double acting shock absorber of the class described, a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, certain of said passageways serving to transmit fluid in one direction through the piston and other of said passageways serving to transmit fluid in the opposite direction, and valve means controlling the selective flow of fluid in said respective passageways; said passageways being arranged so that the first named passageways for flow in said one direction are circumferentially spaced from the second named passageways for flow in the opposite direction, said valves comprising at least one flat resilient leaf element secured to the intermediate portion of one face of the piston and at least one flat resilient leaf element secured to the intermediate portion of the opposite face of the piston, said leaf elements adapted in repose to fit snugly over and seal the respective openings of the respective passageways which they control and to be spaced from the openings of the other passageways, the construction and arrangement being such that the leaf elements are stressed and resiliently bent only in a simple substantially cylindrical configuration by fluid issuing under pressure from the openings which they cover; a reinforcing rib being secured to each of said leaf elements, said rib extending in the direction of a diameter offset 90° circumferentially from the diameter extending through the openings the leaf element is intended to control, the position of said rib not interfering substantially with the cylindrical flexure of said leaf.

References Cited in the file of this patent

UNITED STATES PATENTS

| | | |
|---|---|---|
| 1,220,180 | Burkholder | Mar. 27, 1917 |
| 1,616,091 | Scott | Feb. 1, 1927 |
| 2,316,924 | Whisler | Apr. 20, 1943 |
| 2,346,275 | Read et al. | Apr. 11, 1944 |
| 2,357,920 | Whisler | Sept. 12, 1944 |
| 2,472,841 | Ochs | June 14, 1949 |
| 2,546,051 | Whisler | Mar. 20, 1951 |
| 2,649,937 | Crabtree | Aug. 25, 1953 |